(12) United States Patent
Connors et al.

(10) Patent No.: US 7,250,695 B2
(45) Date of Patent: Jul. 31, 2007

(54) CONTROLLING POWER SUPPLIED TO A CIRCUIT USING AN EXTERNALLY APPLIED MAGNETIC FIELD

(75) Inventors: Timothy Connors, Sunnyvale, CA (US); Geoffrey Martin Lyon, Menlo Park, CA (US); Salil Pradhan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 10/697,686

(22) Filed: Oct. 31, 2003

(65) Prior Publication Data

US 2005/0093374 A1    May 5, 2005

(51) Int. Cl.
*H01H 36/00* (2006.01)
*G01V 9/00* (2006.01)
*G01V 3/02* (2006.01)

(52) U.S. Cl. .................. 307/117; 335/205; 340/572.1

(58) Field of Classification Search ............... 307/414, 307/117; 335/205; 340/527.1, 527.3, 825.72, 340/825.69
See application file for complete search history.

(56) References Cited

U.S. PATENT DOCUMENTS

| | | | |
|---|---|---|---|
| 5,179,337 A * | 1/1993 | Staarman et al. | ........... 320/136 |
| 6,011,483 A | 1/2000 | Tanaka et al. | |
| 6,104,333 A * | 8/2000 | Wood, Jr. | ................ 340/572.1 |
| 6,684,083 B1 | 1/2004 | Harimoto | |
| 6,700,491 B2 * | 3/2004 | Shafer | ..................... 340/572.7 |
| 6,906,436 B2 * | 6/2005 | Jenson et al. | ............... 307/116 |
| 6,927,555 B2 * | 8/2005 | Johnson | ...................... 320/134 |
| 6,969,928 B2 * | 11/2005 | Hanson | ...................... 307/328 |
| 7,016,511 B1 * | 3/2006 | Shennib | ...................... 381/315 |

FOREIGN PATENT DOCUMENTS

| | | |
|---|---|---|
| EP | 1126407 | 8/2001 |
| FR | 2821692 | 9/2002 |
| WO | WO2004/075453 | 9/2004 |

OTHER PUBLICATIONS

Patent Abstracts of Japan—vol. 2000 No. 21—Aug. 3, 2001, Pub # 2001117881.
Patent Abstracts of Japan—vol. 010 No. 030—Feb. 5, 1986, Pub # 60179891.
Patent Abstracts of Japan—vol. 2000 No. 16—May 8, 2001, Pub # 2001006061.

* cited by examiner

*Primary Examiner*—Michael Sherry
*Assistant Examiner*—Andrew M. Deschere

(57) ABSTRACT

A power control circuit is used to control the power supplied to a circuit from a power source. The power control circuit is operable to connect and disconnect the power source from the circuit. The power control circuit connects the power source to the circuit in response to an externally applied magnetic field.

26 Claims, 5 Drawing Sheets

CONTROLLING POWER SUPPLIED TO A CIRCUIT USING AN EXTERNALLY APPLIED MAGNETIC FIELD

TECHNICAL FIELD

This invention relates generally to controlling power supplied to a circuit. More particularly, the invention relates to controlling power supplied to a circuit using an externally applied magnetic field.

BACKGROUND

Optimization of power consumption has become an increasingly important factor in circuit design and product development. Many differing techniques have emerged to reduce power consumption within electronic devices, and many of these techniques are directly related to the physical properties of circuits in the electronic devices. For example, techniques for reducing feature size, such as the size of transistor channels, and reducing operating voltages have yielded large power reductions for integrated circuits during recent decades.

Dynamic techniques applied after the device is powered and operational, such as differing modes of operation and time sequencing of functions, reduce power consumption during inactive periods. For example, most portable devices include processors that support a sleep mode where power is conserved when the user is not using the device. For radio frequency-based devices, instead of continuously listening for a signal, signal detection circuits operate on a periodic basis to conserve power, and the devices switch to a continuous operating mode when appropriate signals are detected. More recent dynamic power control techniques involve scaling the clock frequency and supply voltage of circuits for matching power consumption to the computational demands placed on the device.

Most commonly, a power switch, which may include a mechanical device disconnecting circuitry from a power source, is used to conserve power. All of these techniques may be used to conserve power. However, in almost all of these techniques the device remains powered in some form throughout its operation, even if the majority of the device is functionally disabled or de-powered. Even if a power switch is used, the device is susceptible to loss through leakage current. Furthermore, power switches are typically mechanical and are susceptible to wear. Also, mechanical power switches require physical or contact-based user interaction to enable or disable a device.

SUMMARY OF THE EMBODIMENTS

According to an embodiment, an apparatus includes a power control circuit operable to connect and disconnect a power source from a circuit. The power control circuit connects the power source to the circuit in response to an externally applied magnetic field.

According to another embodiment, a system includes a reader, a passive tag, and a power control circuit. The reader is operable to generate a magnetic field, and the passive tag is operable to generate a signal in response to the magnetic field being applied to the passive tag. The power control circuit is operable to connect and substantially disconnect a power source from a device. The power control circuit connects the power source to the device in response to receiving the signal from the passive tag.

According to yet another embodiment, a method of conserving power in a device includes receiving an externally applied magnetic field and awakening the device from an off mode in response to receiving the externally applied magnetic field. The device is substantially disconnected from a power source in the off mode such that the device is inoperable to perform a function in the off mode.

According to yet another embodiment, an apparatus includes a power source means for supply power to a device; a power control circuit means for connecting and substantially disconnecting the power source means from the device; and a tag means for generating a signal directing the power control circuit means to connect the power source means to the device in response to the magnetic field being applied to the tag means.

According to yet another embodiment, an apparatus controls power supplied to a power consuming circuit. The apparatus includes a circuit operable to generate a signal in response to being within a proximity of an external device. A power control circuit is operable to connect and substantially disconnect a power source from the power consuming circuit. The power control circuit connects the power source to the power consuming circuit in response to receiving the signal from the circuit.

BRIEF DESCRIPTION OF THE DRAWINGS

The present invention is illustrated by way of example and not limitation in the accompanying figures in which like numeral references refer to like elements, and wherein.

DETAILED DESCRIPTION OF EMBODIMENTS

A power control circuit is used to substantially disconnect a power source from a circuit in an off mode for minimizing power consumption in the off mode. According to an embodiment, in the off mode the circuit is substantially not functional. This minimizes the amount of power that is consumed by the circuit when it is not in use. According to another embodiment, the circuit is awakened from the off mode using an externally applied magnetic field. In a conventional design, instead of an off mode, a sleep mode is often used. In the sleep mode power consumption may be minimized by shutting down certain components in a circuit or scaling back operation of specific components. However in sleep mode, at least some components of the circuit or device remain functional to re-awaken the circuit or device from this mode. Using the externally applied magnetic field, according to the embodiment, allows the circuit to be awakened from the off mode without consuming power from the power source. This removes the requirement to utilize a conventional sleep mode, resulting in significant power savings when the device is not in use, but the device still retains the capability of re-activation by the externally applied field.

Figure 1:
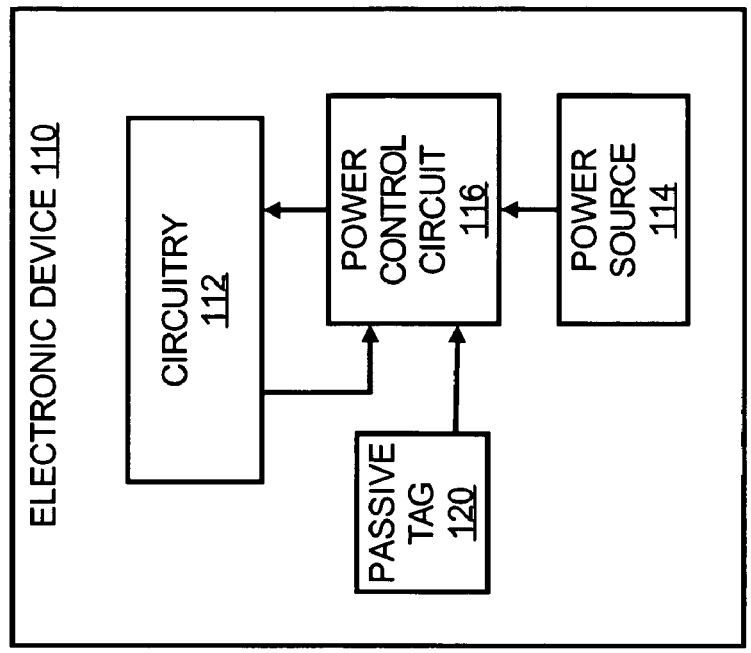
FIG. 1 illustrates a block diagram of a system, according to an embodiment of the invention.
Figure 1:
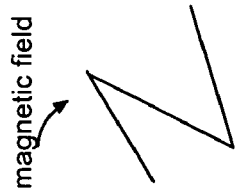
Figure 1:

FIG. 1 illustrates a system 100, according to an embodiment of the invention. The system 100 includes an electronic device 110. The electronic device 110 includes circuitry 112 receiving power from a power source 114. A power control circuit 116 is also connected to the power source 114. When in a power-on state, the power control circuit 116 connects the power source 114 to the circuitry 112. When in a power-off state, the power control circuit 116 disconnects the power source 114 from the circuitry 112, placing the electronic device 110 in an off mode. According to an embodiment, in the power-off state the power control circuit 116 minimizes the amount of current flowing to the circuitry 112 to maximize power conservation in the off mode. For example, some leakage current may be flowing from the power source 114 to the circuitry 112 when the power control circuit 116 is in the power-off state, but the amount of current may be insufficient to allow any functional operation of the circuitry 112. Furthermore, the power control circuit 116 may include components for minimizing the amount of leakage current from the power source 114 when the power control circuit 116 is in the power-off state.

The electronic device 110 may be awakened from the off mode by an externally applied magnetic field. The passive tag 120 may include a transponder with no internal power source. The passive tag 120 may be energized by a magnetic field generated by the reader 122. When the passive tag 120 is energized, the passive tag 120 sends a signal to the power control circuit 116 placing the power control circuit 116 in the power-on state, resulting in the electronic device 110 being awakened from the off mode. In the power-on state, the power source 114 is connected to the circuitry 112 and supplies power to the circuitry 112 such that the circuitry 112 is functional. The power control circuit 116 may be placed in the power-off state, resulting in the circuitry 112 returning to the off mode, in response to receiving a signal from the circuitry 112.

The electronic device 110 may include substantially any type of electronic device, and the circuitry 112 is the circuitry that provides the functionality of the electronic device. The circuitry 112, for example, may include processors, memory, transmitters, receivers, sensors, interfaces, etc. In one embodiment, the electronic device 110 is connected to a power source 114 having limited capacity, such as a battery. For example, the electronic device 110 may comprise a portable device, such as a laptop, cellular phone, or active tag. These devices may use the power control circuit 116 to increase battery life. The electronic device 110 may include non-portable devices, such as televisions, desktop computers, etc. that may use the power control circuit 116 to minimize power consumption. Also, the power source 114 is not limited to a battery and may include other types of known power sources.

Figure 2:
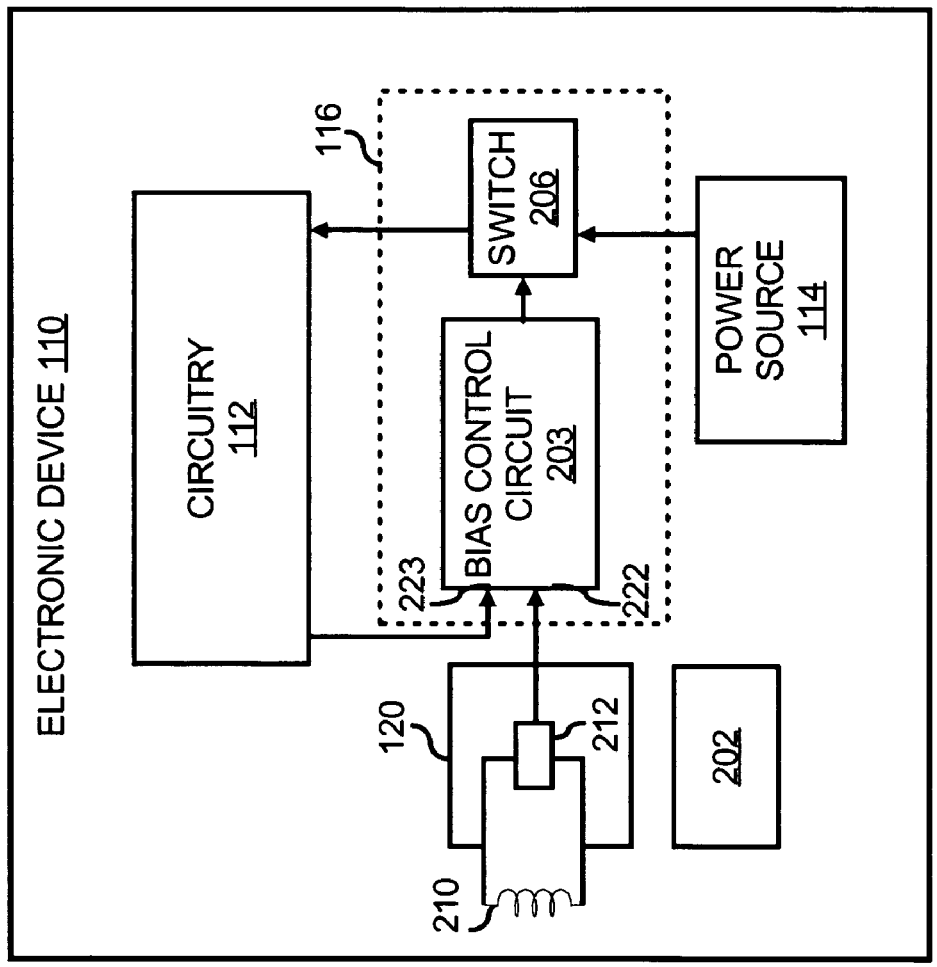
FIG. 2 illustrates a detailed block diagram of the power control circuit in the system shown in FIG. 1.
Figure 2:
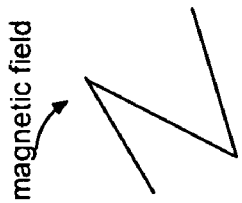
Figure 2:
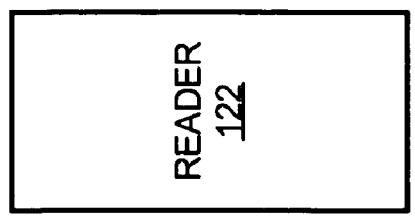

FIG. 2 illustrates an embodiment of the power control circuit 116. The power control circuit 116 may include a bias control circuit 203 and a switch 206. The switch 206 is driven by a signal from the passive tag 120. For example, the passive tag 120 is energized by a magnetic field generated by the reader 122. The passive tag 120 includes an L-C circuit tuned to the frequency of the magnetic field generated by the reader 122. The magnetic field induces a current across the inductor 210 of the passive tag 120. The circuit 212 of the passive tag 120 outputs a signal, such as a bias voltage, to the power control circuit 116. The circuit 212 may include a capacitor such that the passive tag 120 includes an L-C circuit to generate current in response to the applied magnetic field. The circuit 212 may also include charge rectification and storage elements that provide a stable output signal to the power control circuit 116. In a conventional tag, the generated current is typically used to modulate a signal for transmission back to the reader 122. According to an embodiment, the current or a bias voltage is used as a signal for controlling the power control circuit 116 to enter the power-on state.

It will be apparent to one of ordinary skill in the art that the circuit 212 in the passive tag 120 may include other known components, such as a code generator for transmitting a code back to the reader 122 and/or a circuit for comparing a code transmitted by the reader 122 with a stored code. These components are known in the art and generally provide a security function for the passive tag 120. Thus, a code may be required for controlling the power control circuit 116 via the passive tag 120 to prevent unauthorized users from awakening the electronic device 110 and receiving information from the electronic device 110. In addition, the passive tag is one embodiment of a device used to control the state of the power control circuit 116. In this embodiment, the passive tag 120 generates the output signal for placing the power control circuit 116 in the power-on state in response to the passive tag 120 being in proximity of the reader 122. That is the strength of the magnetic field generated by the reader 122 is strong enough to induce a current in the passive tag 120. In other embodiments, instead of a reader and a passive tag, another type of transmitter and receiver (e.g., infrared, ultrasonic, other types of radio frequency) is used to control the state of the power control circuit 116 when the receiver is in proximity of the transmitter. The transmitter and receiver may be low-power, such as when a battery or other limited capacity power source is used.

The power control circuit 116 includes a bias control circuit 203 that conditions the signal from the passive tag 120. The output of the bias control circuit 203 is connected to the switch 206. Thus, the signal received from the passive tag 120 causes the switch 206 to close. If the switch 206 includes a transistor, the signal is used to drive the transistor to the on state (e.g., conducting from the source to the drain), resulting in connecting the power source 114 to the circuitry 112. When the switch 206 is in the on state, the power control circuit 116 is in the power-on state.

When the magnetic field generated by the reader 122 is applied the passive tag 120, the passive tag 120 generates a signal for controlling the power control circuit 116 to enter the power-on state. In one embodiment, the passive tag 120 generates a signal for driving the switch 206 to the on state, resulting in the power source 114 being connected to the circuitry 112. When the magnetic field is removed from the passive tag 120, a signal from the circuitry 112 may be used to maintain the switch 206 in the on state. For example, the electronic device 110 may initially be in the off mode. In the off mode, the power control circuit 116 is in the power-off state, the switch 206 is in the off state, such as non-conducting, and the power source 114 is disconnected from the power source 114. When the magnetic field is applied to the passive tag 120, the power control circuit 114 is driven into the on state, and the power source 114 is connected to the circuitry 112. Thus, the electronic device 110 is awakened from the off mode in response to the externally applied magnetic field generated by the reader 122. When awakened, the circuitry 112 is receiving power from the power source 114, and the circuitry 112 may be fully operational or at least portions of the circuitry 112 may be operational to perform the functions of the electronic device 110.

After being awakened from the off mode, the magnetic field may be removed from the passive tag 120. In order to maintain the awakened state of the electronic device 110 where the power control circuit 116 is in the power-on state, the bias control circuit 203 has the functional equivalence of a logical OR gate. Thus if either of the inputs 222 and 223 to the bias control circuit 203 is active (e.g. at a logical 1 level), the bias control circuit 203 output is active (e.g. maintained at a logic 1 level). For example, the bias control circuit 203 includes two inputs 222 and 223. The input 222 receives a signal from the passive tag 120. The input 223 receives a signal from the circuitry 112. If the signal from the passive tag 120 is not active (e.g., logic level 0), such as when no magnetic field is applied to the passive tag 120, but the circuitry 112 input is active (e.g., logic level 1) the power-on state is maintained by the power control circuit 116. This ensures that the power control circuit 116 is maintained in the power-on state until the circuitry 112 de-activates (e.g., logic level 0) the input 223 to the bias control circuit 203. For example, after the electronic device 110 performs one or more predetermined functions or after a predetermined period of inactivity, the circuitry 112 places the electronic device 110 in the off mode by deactivating the input 223 to the bias control circuit 203. The electronic device 110 may be awakened again by applying the magnetic field generated by the reader 122 to the passive tag 120.

It will be apparent to one of ordinary skill in the art that components may be added or substituted in the power control circuit 116. For example, various circuits may be used to drive the switch 206 in response to a signal from either the passive tag 120 or the circuitry 112.

According to an embodiment, the switch 206 includes a control device with a high off state resistance and a low on state resistance, such as a MOSFET semiconductor switch. The high off state resistance properties of the switch 206 minimize leakage current flowing from the power source 114 to the circuitry 112 when the switch 206 is in the off state and the power control circuit 116 is in the power-off state, improving power conservation.

Figure 3:
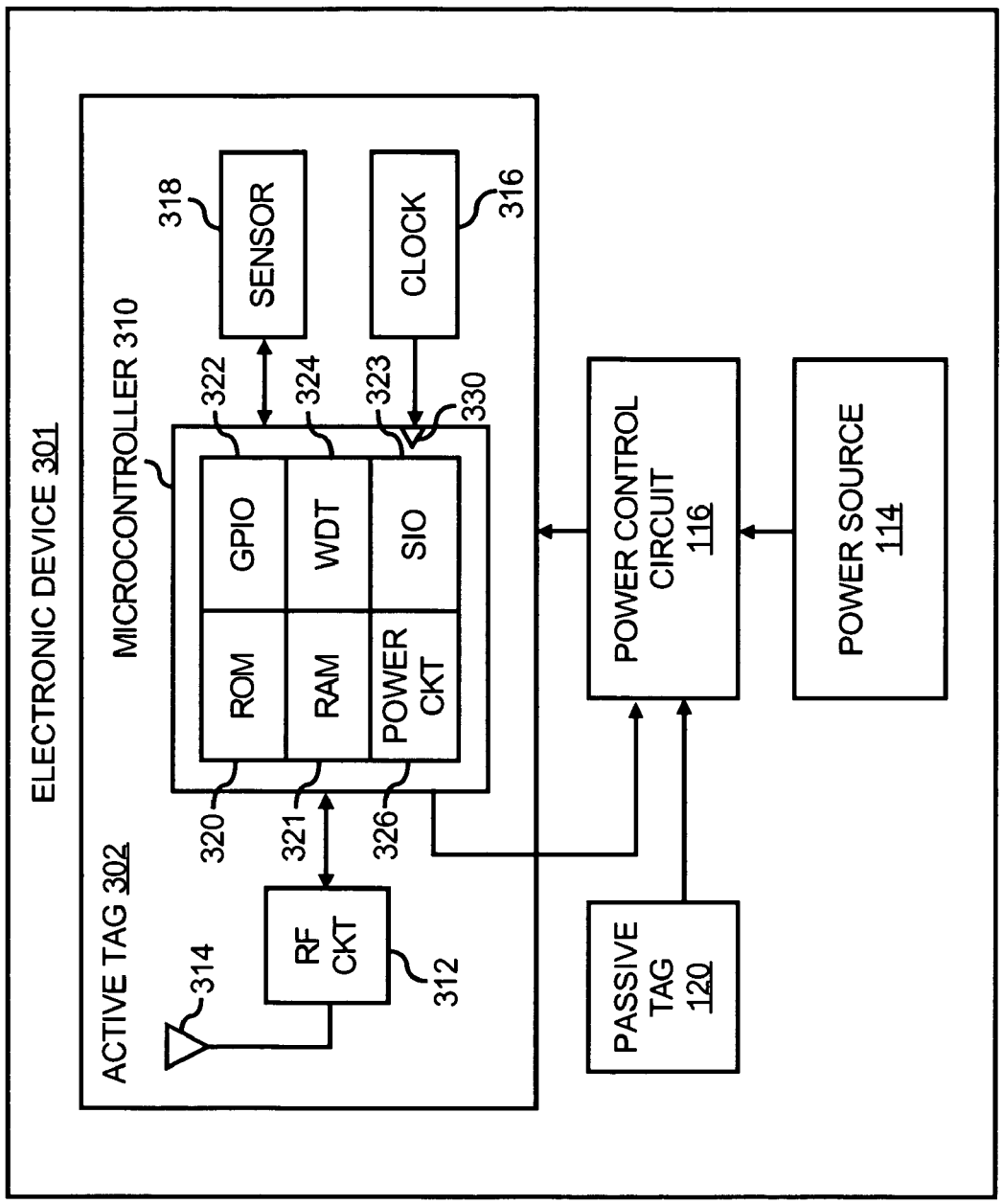
FIG. 3 illustrates a block diagram of system, according to another embodiment of the invention.

FIG. 3 illustrates a system 300 including an active tag 302 in an electronic device 301, according to an embodiment of the invention. The active tag 302 is similar to the passive tag 120, except the circuits of the active tag are powered by an internal power source, such as the power source 114. The active tag 302 may include a microcontroller 310, radio frequency circuitry 312, antenna 314, clock source 316, and sensor 318. The electronic device 301 may include a single device housing the active tag 302, the passive tag 120, the power control circuit 116 and the power source 114. Alternatively, the power control circuit 116 and the passive tag 120 may be included as an add-on device to the active tag 302.

The active tag 302 is controlled by the microcontroller 310. The microcontroller 310 includes a ROM 321 and a RAM 322 storing programs and data. The microcontroller 310 also includes interface circuits, such as a general purpose interface circuit 322 and a dedicated serial interface circuit 323, and a watchdog timer 324 performing timer and watchdog functions. A power control circuit 326 is included for instructing the power control circuit 116 to maintain power or remove power from the active tag 302. A clock source 316 is connected to the microcontroller 310 via a clock interface 330 for controlling the speed of the microcontroller 310. The active tag 302 includes low power radio frequency circuitry 312 and an antenna 314 for providing short range wireless signal transmission and reception.

The active tag 302 may also include one or more sensors, such as the sensor 318. For example, the sensor 318 may be used to detect environmental conditions, such as temperature. The data from the sensor 318 is stored in the RAM 321 and may be transmitted to the reader 122 using the RF circuitry 312 and the antenna 314 in response to the reader 122 awakening the active tag 302.

Power for the active tag 302 is supplied by the power source 114. The active tag 302 is awakened from an off mode by the power control circuit 116, similarly to the circuitry 112 shown in FIG. 1. For example, a magnetic field generated by the reader 122 is applied to the passive tag 120. The passive tag 120 generates a signal for placing the power control circuit 116 in the power-on state. In the power-on state, the power source 114 is connected to the active tag 302, such that power is supplied to the components of the active tag 302. The power control circuit 326 of the active tag 302 sends a signal to the power control circuit 10 instructing the power control circuit 116 to maintain the power-on state or instructing the power control circuit 116 to enter the power-off state by disconnecting the power source 114 from the active tag 302 (i.e., the active tag 302 enters the off mode).

Conventionally, when an active tag enters a sleep mode, power is still supplied to certain circuits in the active tag, such as a watchdog timer, interrupt circuitry, etc., which is operational to periodically awaken the active tag from the sleep mode. The power control circuit 116 in the power-off state substantially disconnects the circuits in the active tag 302 from the power source 114 such that the active tag is inoperable, thereby, optimizing power conservation.

The electronic device 301, including the active tag 302, may be used in several types of applications. For example, if the sensor 318 is included in the active tag 302, the electronic device 301 may be used to monitor the temperature of produce. The electronic device 301 is placed in produce containers. When the container is in close proximity to an access point containing the reader 122, the active tag 302 is awakened from an off mode. The active tag 302 transmits a temperature sensed by the sensor 318 to the reader 122 and returns to the off mode. In another application, the active tag 302 is attached to a container storing goods. When the active tag 302 is awakened by the reader 122 at an access point, the active tag 302 transmits an identification signal to the reader 122. The transmitted identification signal may be used to monitor the location of goods in a supply chain. After transmitting the identification signal or temperature data, the active tag 302 returns to off mode. For example, the power control circuit 116 returns to the power-off state disconnecting the power source 114 from the active tag 302.

Figure 4:
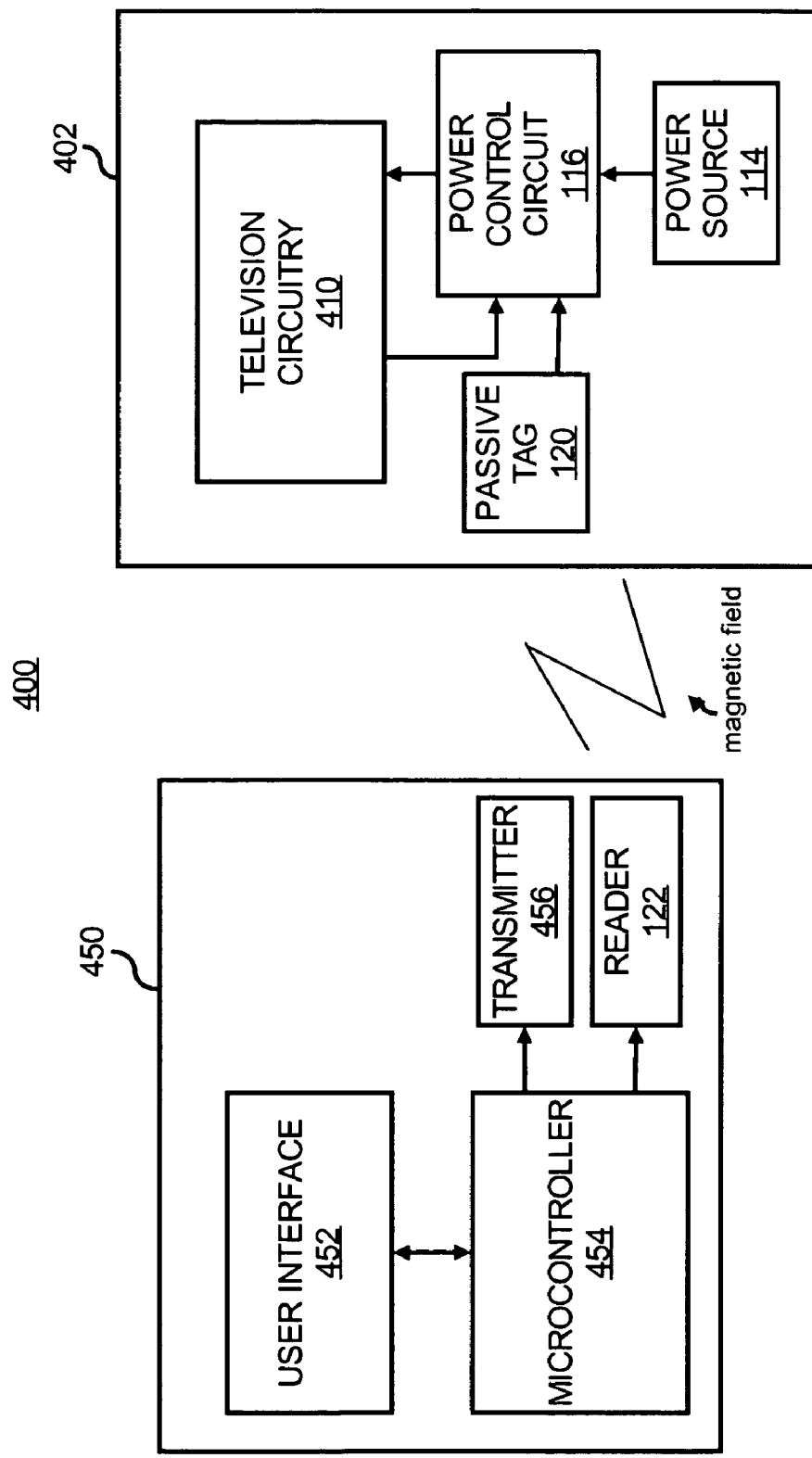
FIG. 4 illustrates a block diagram of system, according to yet another embodiment of the invention.

FIG. 4 illustrates a system 400 according to an embodiment where the power control circuit 116 is used to conserve power for appliances. The system 400 shown in FIG. 4 includes a television 402 including television circuitry 410 connected to the power control circuit 116. The television circuitry 410 includes conventional circuitry performing the functions of a television. The television 402 may include the passive tag 120 and the power control circuit 116. Alternatively, the passive tag and the power control circuit 116 may be included as an add-on device. The television 402 is provided by way of illustration and other compliances may be used instead of a television, such as a VCR, a DVD player, stereo, etc.

The reader 122 may be included in a remote control 450 used to control the functions of the television 402, such as volume control, channel control, etc. The remote control 450 includes a user interface 452, a microcontroller 454, a transmitter 456, and the reader 122. A user hits an on/off button in the user interface 452 to turn on the television 402. The microcontroller 450, which controls functions of the remote control 450, transmits a signal to the reader 122 directing the reader 122 to generate a magnetic field for turning on the television 402. The remote control 450 may include another transmitter 456, such as an infrared transmitter, for transmitting signals to the television 402 for controlling functions such as volume, channel control, etc.

The magnetic field generated by the reader 122 energizes the passive tag 120, which places the power control circuit 116 in the power-on state and connects the power source 114 to the television, awakening the television 402 from the off mode. When the user hits the on/off button on the remote control 450 to turn off the television 402, the television circuitry 410 sends a signal to the power control circuit 116 for placing the power control circuit 116 in the power-off state, resulting in the television 402 entering the off mode. A conventional television will enter a sleep mode, not an off mode, where certain circuit functions are kept alive within the television. For example, conventionally the remote control IR receiver circuitry in the television must always be powered so that the television can respond to requests from the remote control.

Figure 5:
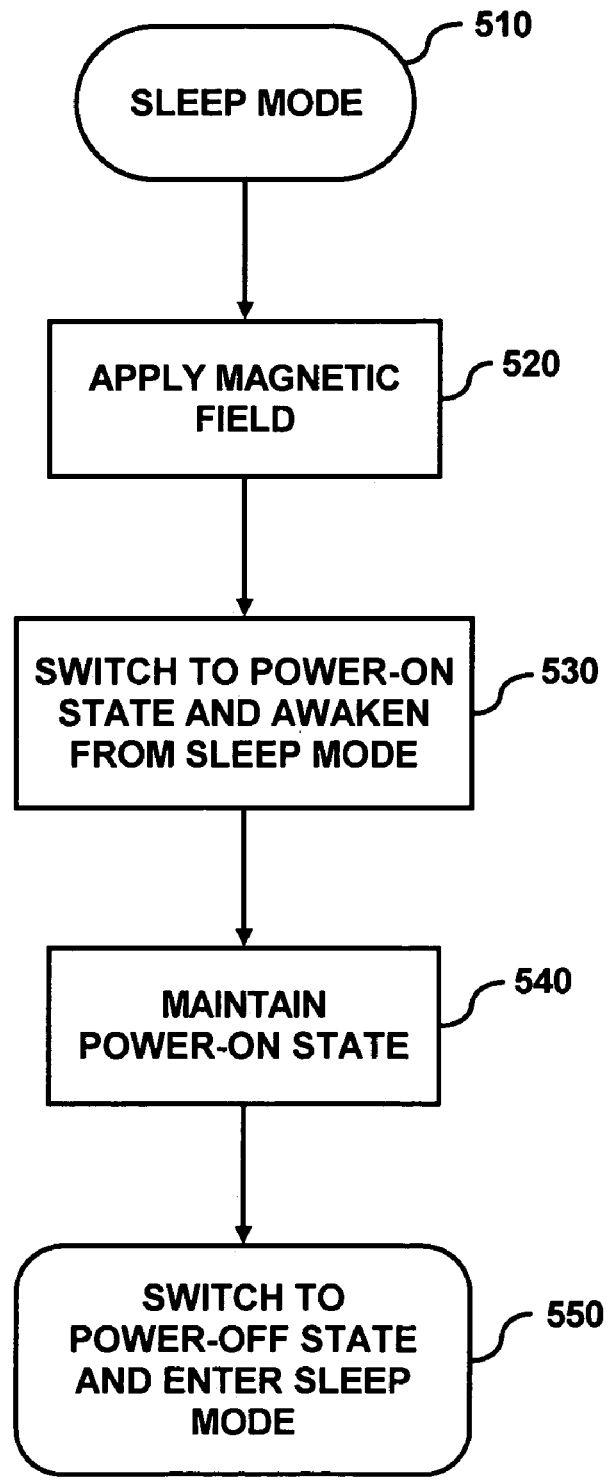
FIG. 5 illustrates a flow chart of a method for conserving power, according to an embodiment of the invention.

FIG. 5 illustrates a method 500 for conserving power for an electronic device, according to an embodiment of the invention. The method 500 is described with respect to FIG. 1 by way of example and not limitation. Furthermore, the steps of the method 500 may be performed by software, hardware or a combination thereof.

At step 510, the circuitry 112 is in off mode and the power control circuit 116 is in the power-off state. In the power-off state, the power source 114 is substantially disconnected from the circuitry 112. A minimal amount of current, such as leakage current, may be flowing to the circuitry 112, but the amount of current is insufficient to power the circuitry 112. Furthermore, the amount of leakage current may be minimized by using a switch in the power control circuit 116 having a high off state resistance, such as a MOSFET semiconductor switching device.

At step 520, a magnetic field generated by the reader 122 is applied to the passive tag 120, and the passive tag 120 is energized by the magnetic field. At step 530, the power control circuit 116 switches to the power-on state in response to a signal generated by the energized passive tag 120. In the power-on state, the power control circuit 116 connects the power source 114 to the circuitry 112. The circuitry 112 is awakened from the off mode.

At step 540, the power control circuit 116 receives a signal from the circuitry 112 for maintaining the power control circuit 116 in the power-on state. For example, the circuitry 112 may drive an input to the power control circuit 116 to a logic level 1 to maintain the power control circuit 116 in the power-on state.

At step 550, the power control circuit 116 returns to the power-off state and the circuitry 112 enters the off mode. For example, the circuitry 112 sends a signal to the power control circuit 116 to place the power control circuit 116 in the power-off state, invoking the off mode. The off mode may be entered, for example, after a period of inactivity or after one or more tasks or functions are completed by the circuitry 112. The circuitry 112 enters the off mode by instructing the power control circuit 116 to return to the power-off state. Instructing the power control circuit 116 may include setting an input to the power control circuit 116 from the circuitry 112 to a logic level 0.

One or more of the steps of the method 500 may be repeated. For example, the power control circuit 116 may be switched between the power-on state and the power-off state as needed to optimize power conservation. These and other variations to the method 500 will be apparent to one of ordinary skill in the art.

What has been described and illustrated herein are embodiments of the invention. The terms, descriptions and figures used herein are set forth by way of illustration only and are not meant as limitations. Those skilled in the art will recognize that many variations are possible within the spirit and scope of the invention.

What is claimed is:

1. An apparatus comprising:
    a power control circuit operable to connect and disconnect a power source from a circuit, the power source supplying power to the circuit,
    wherein the power control circuit connects the power source to the circuit in response to an externally applied magnetic field, and the power control circuit is operable to receive a signal from the circuit for directing the power control circuit to maintain the connection of the power source to the circuit after a removal of the externally applied magnetic field, wherein the connection of the power source to the circuit is otherwise severed after the removal of the externally applied magnetic field and without the signal from the circuit.

2. The apparatus of claim 1, further comprising a passive tag connected to the power control circuit, wherein the passive tag transmits a signal to the power control circuit in response to the magnetic field being applied to the passive tag and the power control circuit connects the power source to the circuit in response to receiving the signal from the passive tag.

3. The apparatus of claim 2, wherein the power control circuit comprises a switch operable to connect and disconnect the power source, wherein the switch has a high off state resistance minimizing leakage current from the power source when the switch disconnects the power source from the circuit.

4. The apparatus of claim 3, wherein the switch comprises a MOSFET semiconductor switching device.

5. The apparatus of claim 3, wherein the signal from the passive tag drives the switch to an on state connecting the power source to the circuit.

6. The apparatus of claim 3, wherein the power control circuit further comprises an OR logic circuit having a first input connected to the passive tag, a second input connected to the circuit and an output connected to the switch, wherein one or more of the signal from the passive tag and a signal from the circuit is operable to place or maintain the switch in the on state.

7. The apparatus of claim 1, wherein the power control circuit is operable to substantially disconnect the power source from the circuit such that an insufficient amount of power is available to allow the circuit to be operational.

8. A system comprising:
    a device having at least a passive tag, a power control circuit, a device circuitry different from the passive tag, and a power source;
    a reader operable to generate a magnetic field;
    the passive tag operable to generate a signal in response to the magnetic field being applied to the passive tag; and
    the power control circuit operable to connect and substantially disconnect the power source from the device circuitry, wherein the power control circuit connects the power source to the device circuitry in response to receiving the signal from the passive tag, and the power control circuit is operable to receive a signal from the device circuitry for directing the power control circuit to maintain the connection of the power source to the device circuitry after a removal of the magnetic field.

9. The system of claim 8, wherein the power control circuit is operable to substantially disconnect the power source from the device circuitry such that an insufficient amount of power is available to allow the device circuitry be operational.

10. The system of claim 8, wherein die power control circuit comprises a switch operable to connect and disconnect the power source, wherein the switch has a high off state resistance minimizing leakage current from the power source when the switch disconnects the power source from the device circuitry.

11. The system of claim 10, wherein the switch comprises a MOSFET semiconductor switching device.

12. The system of claim 10, wherein the signal from the passive tag drives the switch to an on state connecting the power source to the device circuitry.

13. The system of claim 10, wherein the power control circuit further comprises an OR logic circuit having a first input connected to the passive tag, a second input connected to the device and an output connected to the switch, wherein one or more of the signal from the passive tag and a signal from the device is operable to place or maintain the switch in the on state.

14. The system of claim 8, wherein the device circuitry comprises an active tag placed in an off mode when the power control circuit substantially disconnects the power source from the device circuitry, wherein the active tag is inoperable in the off mode to perform a function.

15. The system of claim 14, wherein the active tag is awakened from the off mode in response to the reader generating the magnetic field in the presence of the passive tag.

16. The system of claim 8, wherein the device comprises an appliance placed in an off mode when the power control circuit substantially disconnects the power source from the device circuitry, wherein the appliance is non-functional in the off mode.

17. The system of claim 16, wherein the appliance is awakened from the off mode in response to the reader generating the magnetic field in the presence of the passive tag, the reader being provided in a remote control operable for the appliance.

18. A method of conserving power in a device comprising:
receiving an externally applied magnetic field;
awakening the device from an off mode in response to receiving the externally applied magnetic field, wherein the device is substantially disconnected from a power source in the off mode such that the device is inoperable to perform a function in the off mode, wherein the step of awakening comprises controlling a power control circuit to connect a power source to the device in response to receiving the magnetic field; and
subsequent to a removal of the externally applied magnetic field, controlling a power control circuit to maintain a connection between the power source and the device in response to receiving a signal from the device that directs the power control circuit to maintain the connection, the signal is separate from any signal that is generated in response to the externally applied magnetic field.

19. The method of claim 18, further comprising controlling the power control circuit to substantially disconnect the power source from the device such that the device reenters the off mode.

20. An apparatus comprising:
a power source means for supply power to a device;
a power control circuit means for connecting and substantially disconnecting the power source means from the device; and
a tag means for generating a signal directing the power control circuit means to connect the power source means to the device in response to the magnetic field being applied to the tag means; and
wherein the power control circuit is operable to receive a signal from the circuit for directing the power control circuit to maintain the connection of the power source to the device after a removal of the applied magnetic field, wherein the signal is separate from any signal that is generated in response to the applied magnetic field.

21. The apparatus of claim 20 further comprising a reader means for generating the magnetic field.

22. An apparatus controlling power supplied to a power consuming circuit, the apparatus comprising:
a circuit operable to generate a signal in response to being within a proximity of an external device; and
a power control circuit operable to connect and substantially disconnect a power source from the power consuming circuit, wherein the power control circuit connects the power source to the power consuming circuit in response to receiving the signal from the circuit, and the power control circuit is further operable to receive a signal from the power consuming circuit for directing the power control circuit to maintain the connection of the power source to the power consuming circuit after a removal of the circuit from the proximity of the external device, wherein the signal from the circuit is separate from any signal that is generated in response to the circuit being within a proximity of the external device.

23. The apparatus of claim 22, wherein the circuit is included in a receiver operable to receive a control signal from a transmitter for invoking the circuit to generate the signal.

24. The apparatus of claim 23, wherein the receiver includes a passive tag and the control signal is a magnetic field inducing a current in the passive tag.

25. The apparatus of claim 22, wherein the power consuming circuit is included in one of an active tag and an appliance.

26. The apparatus of claim 22, wherein the power control circuit is operable to substantially disconnect the power source from the power consuming circuit such that an insufficient amount of power is available to allow the power consuming circuit to be operational.

* * * * *

UNITED STATES PATENT AND TRADEMARK OFFICE
CERTIFICATE OF CORRECTION

PATENT NO.       : 7,250,695 B2
APPLICATION NO.  : 10/697686
DATED            : July 31, 2007
INVENTOR(S)      : Timothy Connors et al.

It is certified that error appears in the above-identified patent and that said Letters Patent is hereby corrected as shown below:

In column 6, line 13, after "circuit" delete "10" and insert -- 110 --, therefor.

In column 9, line 9, in Claim 10, after "wherein" delete "die" and insert -- the --, therefor.

Signed and Sealed this

Twenty-fourth Day of November, 2009

David J. Kappos
*Director of the United States Patent and Trademark Office*